W. H. BINES.
METHOD FOR TREATING RUBBER.
APPLICATION FILED DEC. 29, 1920.
1,400,137. Patented Dec. 13, 1921.
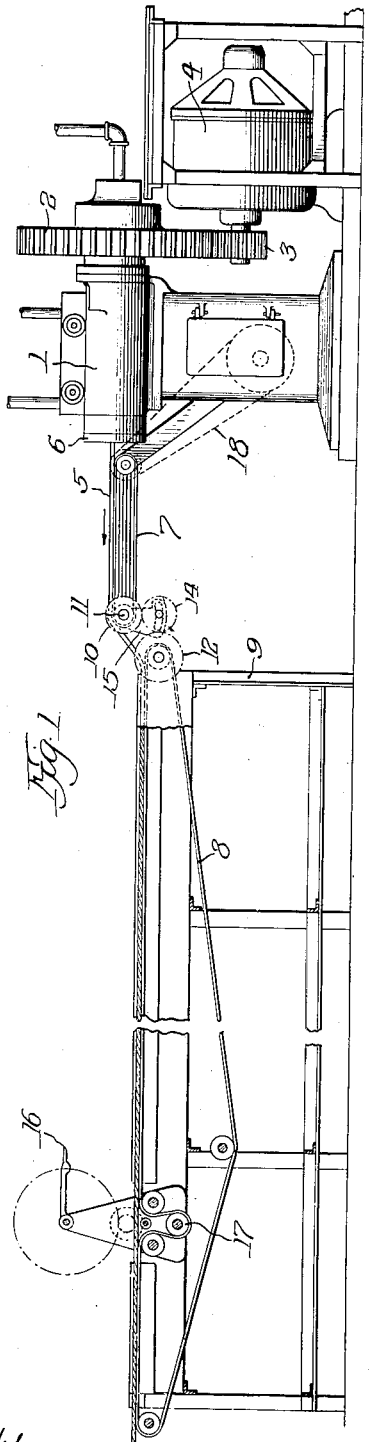
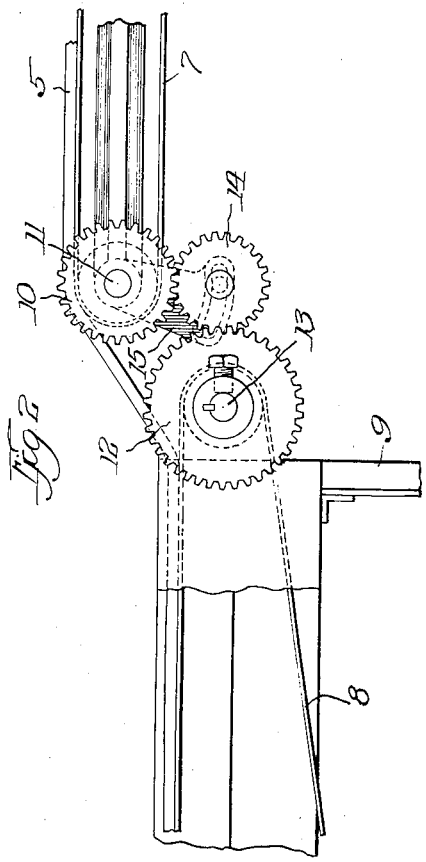
Inventor
William H. Bines,

UNITED STATES PATENT OFFICE.

WILLIAM H. BINES, OF AKRON, OHIO, ASSIGNOR TO THE FIRESTONE TIRE AND RUBBER COMPANY, OF AKRON, OHIO, A CORPORATION OF OHIO.

METHOD FOR TREATING RUBBER.

1,400,137.  Specification of Letters Patent.  Patented Dec. 13, 1921.

Application filed December 29, 1920. Serial No. 433,840.

*To all whom it may concern:*

Be it known that I, WILLIAM H. BINES, a citizen of the United States, residing at Akron, in the county of Summit and State of Ohio, have invented certain new and useful Improvements in Methods for Treating Rubber, of which the following is a specification.

This invention relates particularly to a method for treating rubber and is intended to improve some of the conditions present in treating this material.

While it will be described as applied to a process of treating rubber as it is extruded from the well-known "tubing machine" in the form of a tread strip, the process is capable of many applications and uses, as will be understood by those skilled in the art.

In the manufacture of rubber stock by the extrusion method, particularly the extrusion of tread gums for the manufacture of treads of pneumatic tires, the stock is placed in the cylinder or barrel of a die extruding machine, in which it is acted upon by a screw which forces the rubber outwardly to the die opening. The opening is usually in the form of a long narrow slot, tapering toward its ends, the shape of the finished tread strip. As the strip issues from the die opening, it is more or less wavy or undulatory in the center due to the stresses put into the gum as it is forced outward through the die.

In the general practice the tread strip, as it issues from the machine, is received on a traveling belt, the speed of which is adjusted to the speed of the issuing strip of material so that a determined stretch is given and the strip reduced to the width desired. The strip is then cut into predetermined lengths, in some instances being cooled by immersion in a trough of water.

The shrinkage which takes place in the tread strip in attaining its final "set" is due either to cooling or to the relieving of the stresses which are placed in the tread upon being forced out of the die, or to both causes, or for some other cause which has not yet been determined. In the ordinary shop practice the inability to gage or allow for shrinkage has caused much loss owing to the impossibility of cutting the strip to the exact length required for subsequent use and to the rehandling necessitated by the recutting.

It has been found that the tendency for shrinkage may be overcome by placing the tread strip under a certain degree of compression while it is still warm and as it issues from the tube machine, variable according to the characteristics of the stock, so that the tread may be accurately cut as it issues from the extruding machine, a result which has not been accomplished heretofore. The explanation of this fact may reside in the fact that enough compression is placed in the rubber strip so that, as the subsequent shrinkage takes place in the rubber, a reserve is provided which compensates for the shrinkage.

The present invention is directed to the method of handling the extruded rubber strip by placing a certain and predetermined amount of compression in the rubber stock as it issues from the machine and before it is cut to length, so that accurate cutting may be obtained without the loss incident to the overlength cutting which has been prevalent heretofore and without recutting to size after the stock has taken its set. A form of apparatus for carrying out the process is shown in the drawings accompanying this application, but it is obvious that changes and modifications may be made without departure from the essential feature of the invention.

In the drawings:

Figure 1 is a side elevation of an apparatus, suitable for carrying out the process outlined above.

Fig. 2 is an enlarged view of the gearing between the two conveyer belts.

In the drawings, 1 represents the extruding machine known in the art as a "tubing machine" provided with the large gear 2 to drive the screw for forcing the rubber outwardly through the die opening, the gear being driven by pinion 3 on the shaft of the motor 4.

The tread strip 5, as it issues from the head 6 of the tubing machine, is received on an endless belt 7. This belt is driven by chain 18, or other suitable means, a little faster but in timed relation to the speed of the oncoming strip so that the tread is drawn down to the proper width.

Arranged at the end of the belt 7 is a second conveyer belt 8 mounted on a long table 9. Between the belts 7 and 8 is located any suitable driving mechanism so that the speed of the belt 8 may be regulated in respect to the speed of the belt 7. This may be in any suitable form, it being essential that means be incorporated in the mechanism to vary the differential speed between the two belts to accommodate different qualities of stock. Any suitable form of self-contained speed changing mechanism may be substituted for the kind shown.

In the particular form illustrated, a gear 10 is carried on the shaft 11 of the belt 7 and a gear 12 on the shaft 13 of the belt 8. The said gears are connected by an idle pinion 14 adjustably mounted in a bracket 15. If it is desired to vary the speed of the belt 8 with respect to the speed of the belt 7, appropriate changes may be made in the gearing. The differential speed between the two conveyer and supporting belts is determined by the different character of the rubber stocks used, it having been found that some stocks require a greater degree of compression to offset the shrinking which occurs upon cooling and setting of the stock, due to the different coefficients of shrinkage.

The result of the slower movement of the belt 8 to the belt 7 is to introduce into the tread strip, as it passes over the gap between the belts, a fixed and definite degree of compression. Upon the cooling or setting of the stock, whatever shrinkage occurs will be drawn from the compression within the stock itself. As a result it is possible to cut the stock immediately to the lengths desired.

To perform this operation, I mount over the tread a knife, wire or other cutting instrumentality, illustrated at 16, which is so timed in its operation that it will cut the desired lengths of material. The belt is dipped out of the path of the knife as shown at 17. Due to the improvement which has been described in the foregoing specification, the cutting of the stock may be accurately done so there is no need for any rehandling in preparation of the tread for the tire.

The particular form of knife is non-essential and workmen provided with shears are often employed for this work.

Changes in the apparatus may be made, and it is understood that other means than the one shown herein may be devised for placing compression within the hot tread strip issuing from the die, so as to compensate for subsequent shrinkage. Equivalent means and processes are intended to be covered by the appended claims and I do not intend to be limited to the exact form or proportions shown or described.

I claim:

1. The process of treating rubber comprising, shaping the rubber in desired form, and, before it has become set, placing it under compression.

2. The process of treating rubber comprising, forming the rubber while hot and, before it has become set, placing it under compression.

3. The process of treating rubber comprising the steps of extruding the rubber from a die and, while the stresses from the extruding process are still in the rubber, placing it under compression.

4. The process of treating rubber comprising the steps of extruding the rubber from a heated die, and, while the stresses from the extruding process are still in the rubber and while the rubber is still hot, placing it under compression.

5. The process of treating rubber, comprising counteracting the tendency of the stock to shrink during setting by placing it under compression.

6. The process of treating rubber which has been extruded and is heated throughout, comprising counteracting the tendency of the stock to shrink upon setting by placing it under compression.

7. The process of forming treads comprising extruding the tread material from a heated die, reducing the tread material to the proper width by stretching it longitudinally and the placing it under compression.

8. The process of forming treads comprising extruding the tread material from a heated die, placing the tread material under compression and cutting while under compression.

9. A process of forming raw rubber tread strips, comprising, extruding the treads from a heated die, placing the tread material under compression, the degree of compression being determined by the coefficient of shrinkage in the stock, and cutting the treads from the strips while under compression.

WILLIAM H. BINES.